United States Patent
Lecointe

(10) Patent No.: US 11,417,156 B2
(45) Date of Patent: Aug. 16, 2022

(54) METHOD AND SYSTEM FOR MANAGING A MAINTENANCE TASK OF A MOTOR VEHICLE

(71) Applicant: PSA AUTOMOBILES SA, Poissy (FR)

(72) Inventor: Pierre Lecointe, Massy (FR)

(73) Assignee: PSA AUTOMOBILES SA, Poissy (FR)

(*) Notice: Subject to any disclaimer, the term of this patent is extended or adjusted under 35 U.S.C. 154(b) by 0 days.

(21) Appl. No.: 17/619,537

(22) PCT Filed: Jun. 29, 2020

(86) PCT No.: PCT/FR2020/051127
§ 371 (c)(1),
(2) Date: Dec. 15, 2021

(87) PCT Pub. No.: WO2021/001618
PCT Pub. Date: Jan. 7, 2021

(65) Prior Publication Data
US 2022/0207927 A1 Jun. 30, 2022

(30) Foreign Application Priority Data
Jul. 3, 2019 (FR) ...................... 1907385

(51) Int. Cl.
*G07C 5/08* (2006.01)
*G07C 5/00* (2006.01)

(52) U.S. Cl.
CPC .......... *G07C 5/008* (2013.01); *G07C 5/0808* (2013.01); *G07C 5/0825* (2013.01)

(58) Field of Classification Search
None
See application file for complete search history.

(56) References Cited

U.S. PATENT DOCUMENTS

| | | | |
|---|---|---|---|
| 9,922,557 B2* | 3/2018 | Nathanson | H04L 69/22 |
| 10,431,008 B2* | 10/2019 | Djajadiningrat | G16H 80/00 |
| 2001/0002450 A1 | 5/2001 | Mizutani et al. | |
| 2016/0147488 A1 | 5/2016 | Zakharov | |
| 2020/0074768 A1* | 3/2020 | Rozint | G06Q 10/20 |
| 2021/0407217 A1* | 12/2021 | Jefferies | G06Q 30/0645 |

FOREIGN PATENT DOCUMENTS

WO 2006055289 A2 5/2006

OTHER PUBLICATIONS

International Search Report for PCT/FR2020/051127 dated Nov. 2, 2020.
Written Opinion for PCT/FR2020/051127 dated Nov. 2, 2020.
Wang et al; "Remote sensing, diagnosis and collaborative maintenance with Web-enabled virtual instruments and mini-servers", The International Journal of Advanced Manufacturing Technology; vol. 24, No. 9, pp. 764-772, Nov. 1, 2004, DOI: 10.1007/S00170-003-1753-4, ISSN: 0268-3768.

* cited by examiner

*Primary Examiner* — Abdhesh K Jha
(74) *Attorney, Agent, or Firm* — Sandberg Phoenix & von Gontard PC

(57) ABSTRACT

The invention relates to a distributed system (100) for managing a maintenance task of a motor vehicle and to a method for managing a maintenance task of a motor vehicle implemented by means of such a system.

8 Claims, 2 Drawing Sheets

METHOD AND SYSTEM FOR MANAGING A MAINTENANCE TASK OF A MOTOR VEHICLE

CROSS-REFERENCE TO RELATED APPLICATIONS

This application is the US National Stage under 35 USC § 371 of International Application No. PCT/FR2020/051127, filed 29 Jun. 2020 which claims priority to French Application No. 1907385 filed 3 Jul. 2019, both of which are incorporated herein by reference.

BACKGROUND

The present invention relates to the field of systems for maintenance tasks of automobiles. The invention relates in particular to a distributed system for managing a maintenance task of a motor vehicle as well as to a method implemented by means of such a system. The invention applies in particular to managing maintenance tasks for passenger cars.

It is known that the maintenance tasks of current motor vehicles carried out after sales often require connecting computer tools to the diagnostic and/or maintenance equipment on board vehicles (e.g. OBD port). Generally, such IT tools come in the form of laptops, touch-sensitive tablets or other portable IT devices that, most of the time, autonomously run one or more software applications allowing the management of maintenance tasks and which in particular allow communication with the on-board diagnostic equipment of vehicles by being connected to them by means of cables or, more recently, wirelessly, via vehicle communication interfaces (or VCI) and the implementation of communication protocols using radiofrequency signals (e.g. Wi-Fi, Bluetooth, Zigbee, etc.). In this case, it is therefore generally a simple electronic device that jointly controls a graphical interface displayed on a screen, the interactions with the communication interface connected to the vehicle and the operations relating to maintenance tasks (e.g. fault diagnosis, updates, etc.). This means that these devices must have significant computing resources. However, given the intended use of these devices, they are by definition intended to remain as light as possible, which obviously does not favor their ability to be powerful, despite a usage context where, as the maintenance tasks to be carried out on vehicles become more complex, the computing resources necessary to implement them will inevitably continue to increase.

Consequently, if we continue to use the current vehicle maintenance management systems mentioned above, namely the systems with purely local operation, given the increasing evolution of the complexity of maintenance tasks, we cannot rule out a high frequency of the renewal of computing devices and/or the need to update them regularly, which can lead to periods of unavailability of these devices of varying lengths, which are not desirable.

In addition, another problem with current systems lies in the fact that a single computer tool therefore generally interacts with the communication interface connected to the vehicle and generates a single graphical interface that makes it possible to manage the maintenance tasks. However, these technical constraints prevent any change in the way of managing maintenance tasks aimed at allowing more efficient management, whether in terms of costs, resources consumed, or quality produced. It is indeed noted that these constraints for example prohibit the implementation of functionalities for the collaborative management of maintenance tasks jointly assumed by on-site technicians and experts located remotely.

SUMMARY

The disclosed method and system aims to overcome these drawbacks. The object is in particular to provide a method and a system that contribute to reducing the load in computing resources on the computing devices involved in managing maintenance tasks which are located on the sites where maintenance tasks are carried out and which are therefore configured, in particular, to interact with communication interfaces connected to on-board diagnostic equipment of motor vehicles. In addition, the method and system enable on-site technicians and experts located remotely to manage vehicle maintenance tasks collaboratively, i.e. jointly, by means of communication interfaces connected to vehicles.

These goals are achieved, according to a first object, by means of a distributed system for managing a maintenance task of a motor vehicle, the system comprising:
  a first computing device on which a client module is run, the client module being configured to interact with a communication interface that can be connected to on-board diagnostic equipment of a motor vehicle, and
  a first server configured to control a graphical interface generated on a screen of the first computing device and interactions between the client module and the communication interface as a function of data characterizing operations carried out at a second computing device transmitted by a second server configured to interact with the second computing device in order to transmit the data characterizing operations carried out at a second computing device.

According to one variant, the first server can be configured to interact with a remote data source and/or a third server to acquire the client module.

According to another variant, the first server can be configured to interact with a portal accessible by means of a browser.

According to another variant, the graphical interface can be generated by means of a browser.

According to another variant, the first and/or the second computing device can be a portable electronic device.

A further object is a method for managing a maintenance task of a motor vehicle, the method being implemented by means of a system as described above and comprising the steps of:
  receiving, by the first server, data characterizing a request to implement a maintenance task in connection with the first computing device,
  transmitting, by the first server, data for generating the graphical interface to the first computing device,
  determining, by the first server, data characterizing the availability of the second computing device,
  receiving, by the first server, the data characterizing operations carried out at a second computing device transmitted by the second server,
  controlling, by the first server, the graphical interface and interactions between the client module and the communication interface as a function of the data characterizing operations carried out at a second computing device.

According to one variant, the method can comprise the steps of:
- determining, by the first server, data characterizing the client module as a function of the data characterizing a request to implement a maintenance task, and/or
- acquiring the client module by interacting with a remote data source and/or the third server.

According to another variant, the method can comprise a step of transmitting, by the first server, data for reproducing the graphical interface on a screen from the second computing device to the second server.

According to another variant, the method can comprise a step of receiving, by the first server, data characterizing at least one right to request a particular assistance service.

BRIEF DESCRIPTION OF THE FIGURES

Other features and advantages of the system and method will become apparent on examination of the detailed description that follows and from the appended drawings, in which.

DETAILED DESCRIPTION

Figure 1:
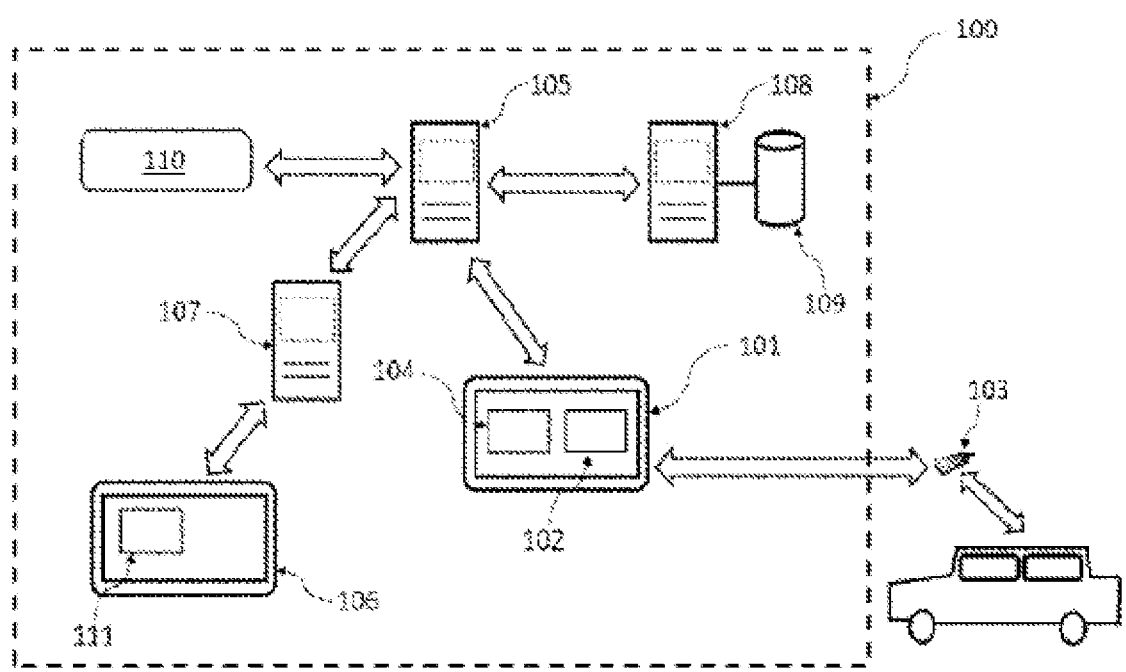
FIG. 1 is a functional diagram of a system for managing a maintenance task of a motor vehicle.

A system 100 for managing a maintenance task of a motor vehicle is a distributed system, as shown in FIG. 1, comprises a first computing device 101 intended to be operated by a technician on site and on which a client module 102 is run. The client module 102 is configured to interact, preferably wirelessly, with a communication interface 103 that can be connected, for example plugged in, to on-board diagnostic equipment of a motor vehicle (e.g. OBD port). The system 100 further comprises a first server 105 configured to generate and/or control a graphical interface 104 broadcast on a screen of the first computing device, preferably by means of a browser, and the interactions between the client module 102 and the communication interface 103 as a function of data characterizing operations performed at a second computing device 106 intended to be operated by a remote expert and which interacts with a second server 107 configured to control a reproduction 111 of the graphical interface 104 on a screen of the second computing device 106 and to monitor the operations performed at the reproduction 111. The system 100 further comprises a portal 110, accessible by means of a browser, and a third server 108 connected to a data source 109 which are configured to interact with the first server 105. All these elements of the system 100 communicate through communication network equipment that may be private or public (e.g. Internet), wired or wireless, as illustrated schematically in the figure by the bidirectional arrows. In addition, according to a particular embodiment of the system, the first 101 and/or the second 106 computing device is (are) a portable electronic device(s) (e.g. smartphone, tablet, etc.).

Figure 2:
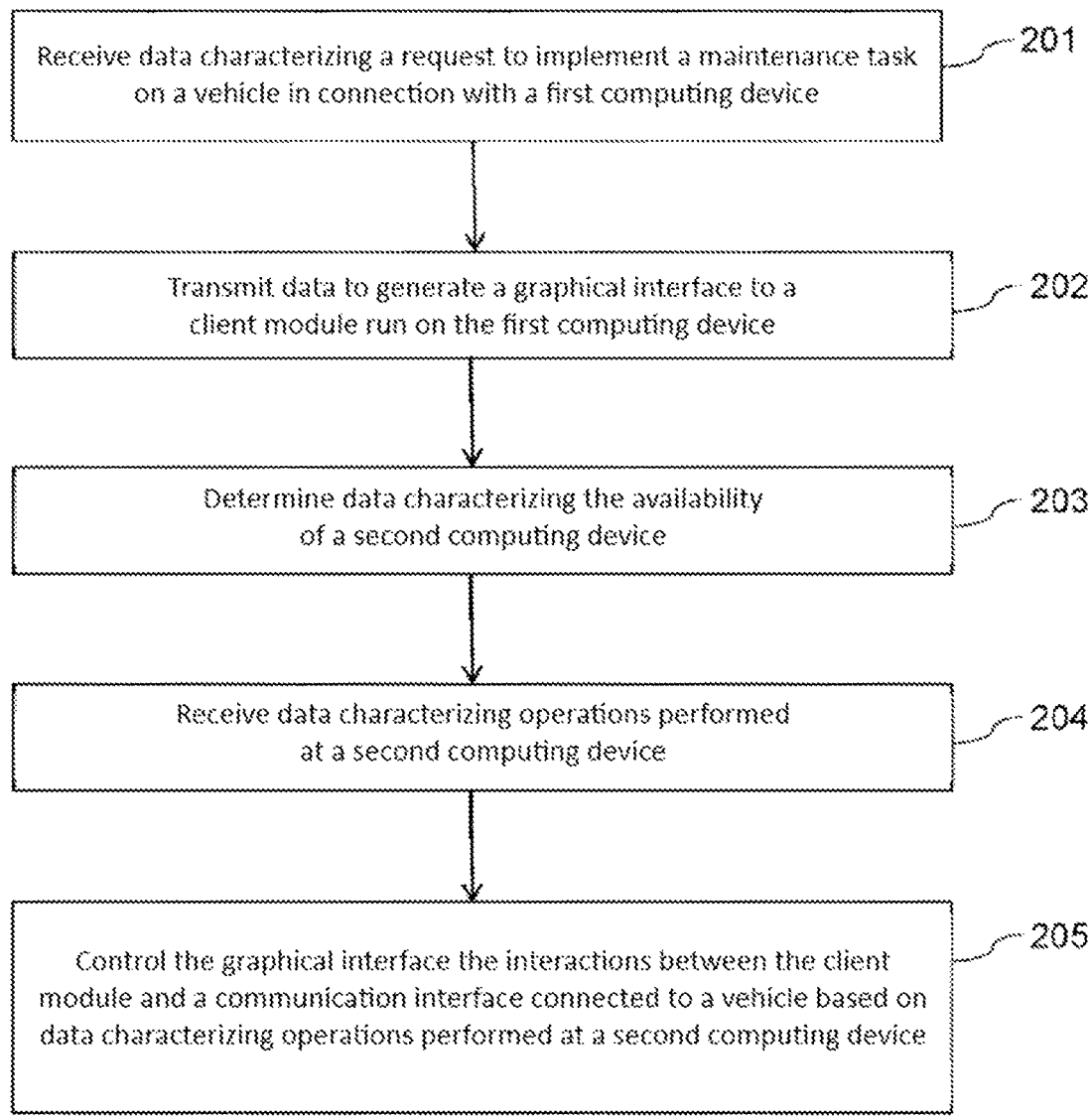
FIG. 2 is a flowchart illustrating certain steps of a method for managing maintenance tasks.

All the elements described above are used to implement a method for managing a maintenance task of a motor vehicle, as described below in connection with FIG. 2.

According to a first step 201 of the method, the first server 105 receives data characterizing a request to implement a maintenance task in connection with the first computing device 101. This is particularly the case when an on-site technician operates a browser of the first computing device 101 to access the portal 110 in order to launch a maintenance task for a vehicle whose on-board diagnostic equipment (e.g. OBD port) is connected to the vehicle communication interface 103. In this case, the portal 110 generates the data characterizing a request for the implementation of a maintenance task and transmits them to the first server 105. Advantageously, these data comprise data characterizing information relating to the vehicle, for example its make, its vehicle identification number, etc. On receipt of this data, the first server transmits the client module 102 to the first computing device 101. Alternatively, the first server 105 first performs an ancillary step during which it uses the data characterizing a request to implement a maintenance task to determine data characterizing the client module 102 and/or to acquire the client module 102 by interacting with the third server 108 and/or with the data source 109. Furthermore, according to another alternative, the first server 105 performs another ancillary step during which it receives data from the portal 110 characterizing a right to request a particular assistance service. This is the case, for example, if the technician has previously subscribed to a specific assistance service by interacting with the portal 110. In this case, the first server 105 also takes account of these data to determine the data characterizing the client module 102 and/or to acquire the client module 102 by interacting with the third server 108 and/or the data source 109. Thus, at the end of this first step 201, the client module 102 is downloaded, installed and/or run on the first computing device 101. At this stage, the on-site technician can therefore operate the first computing device 101 to autonomously manage a maintenance task by interacting with the communication interface 103 connected to the on-board diagnostic and/or maintenance system of the vehicle. In addition, the first computing device 101 can also be operated at this stage by the technician to interact with the second server 107, for example to access, by means of a browser, a knowledge base stored on the second server 107.

Then, according to a second step 202 of the method, the first server 105 transmits data making it possible to generate the graphical interface 104 to the first computing device 101. This is for example the case when the on-site technician launches an operation relating to a maintenance task (e.g. reading fault codes, checking the air conditioning circuit, etc.), which is executed at the request of the first device 101 by the first server 105 and the results of which are displayed on the graphical interface 104.

Then, according to a third step 203 of the method, the first server 105 determines data characterizing the availability of the second computing device 106. In other words, during this step, the first server 105 checks whether an expert operating the second computing device is connected to the second server 107. To do this, the first server 105 can regularly submit a request to the second server 107, which generates a transmission by the latter of data characterizing the availability of a plurality of connected computing devices.

Then, according to a fourth step 204 of the method, the first server 105 receives data characterizing operations carried out at a second computing device transmitted by the second server 107. This is particularly the case when the on-site technician has interacted with the graphical interface 104 to launch a collaborative maintenance management process. In this context, according to one example, the first computing device 101 first transmitted data to the first server 105 characterizing a request for the implementation of a collaborative management process. Then, the first server 105 informed the second server 107 of the availability of a support mission and then, in return, was informed by the second server 107 of the acceptance of the support mission by the second computing device 106. The first server 105 then transmitted data to the second server 107 which enabled the second server 107 to control a reproduction 111, i.e. a true copy at all points, of the graphical interface 104 on a screen of the second computing device 106. Then, when operations have been performed with regard to the reproduction 111, the data characterizing operations performed at a second computing device have been generated and transmitted to the first server 105 by the second server 107.

Finally, during a fifth step 205 of the method, the first server 105 controls the graphical interface 104 generated on the screen of the first computing device 101 and the interactions between the client module 102 and the communication interface 103 as a function of data characterizing operations performed at a second computing device. Thus, with regard to the operations induced by the maintenance tasks (e.g. control instructions/computer requests to the vehicle and its computers), during this step the first server 105 assumes a gateway role between the second device 106 and the communication interface 103 in a manner that is transparent for the on-site technician. Thus, the second computing device 106 can interact directly with the on-board diagnostic equipment of the vehicle. In addition, the first server 105 also assumes another role that comprises rendering the operations performed at the second computing device 106 on the graphical interface 104 that is broadcast on the screen of the first computing device 101. Thus, it is the first server 105 which fully assumes the load in terms of computing resources necessary to implement the maintenance tasks (e.g. fault diagnosis). On the contrary, the computing resources of the first computing device 101 may remain reduced insofar as the latter remains limited to distributing the graphical interface 104 and managing interactions with the communication interface 103.

Consequently, under the terms of the system and method, a lower computational resource load is imposed on the computing devices involved in managing maintenance tasks that are on sites where the maintenance tasks are performed. In addition, the system and method allow the implementation of functionalities for collaborative management of maintenance tasks jointly assumed by on-site technicians and experts located remotely, which undoubtedly contributes to facilitating an improvement in the efficient management of these complex tasks.

The invention claimed is:

1. A distributed system for managing a maintenance task of a motor vehicle, the system comprising:
   a first computing device on which a client module is run, the client module being configured to interact with a communication interface that is adapted to be connected to on-board diagnostic equipment of a motor vehicle,
   a first server configured to control a graphical interface generated on a screen of the first computing device and to control interactions between the client module and the communication interface;
   a second server in communication with said first server, said second server being configured to receive data from said first server, to control a second computing device to generate a reproduction of the graphical interface on a screen of the second computing device as a function of the data received from the first server, and to monitor the operations performed at the second computing device with regard to the reproduction; whereby said second server is adapted to transmit to said first server data characterizing operations carried out at said second computing device and wherein said first server controls said graphical interface on said first computing device in response to the data received from said second server; and
   wherein the first server is adapted to operate as a gateway between the second computing device and the communication interface such that the second computing device is adapted to interact directly with the on-board diagnostic equipment of the vehicle.

2. The system according to claim 1, wherein the first server is configured to interact with a remote data source and/or a third server to acquire the client module.

3. The system according to claim 1, wherein the first server is configured to interact with a portal accessible by means of a browser.

4. The system according to claim 1, wherein the graphical interface is generated by means of a browser.

5. The system according to claim 1, wherein the first and/or the second computing device is a portable electronic device.

6. A method for managing a maintenance task of a motor vehicle, wherein the method is implemented by means of the system according to claim 1, and wherein the method comprises the steps of:
   the first server receiving, from the first computing device, data characterizing a request to implement a maintenance task,
   the first server transmitting to the first computing device data for generating the graphical interface,
   the first server receiving from a second server data characterizing the availability of the second computing device,
   said first server transmitting to said second server data representative of said graphical user interface;
   said second server controlling said second computing device to generate a reproduction of the graphical interface on a screen of a second computing device as a function of the data received from the first server and to monitor the operations performed at the second computing device with regard to the reproduction;
   said first server, receiving from said second server, data characterizing operations carried out at the second computing device,
   the first server controlling the graphical interface on the first computer device and interactions between the client module and the communication interface as a function of the data characterizing operations carried out at a second computing device whereby the second computing device communicates with the communication interface such that the second computing device interacts directly with the on-board diagnostic equipment of the vehicle.

7. The method according to claim 6, wherein the method comprises the steps of:
   determining, by the first server, data characterizing the client module as a function of the data characterizing a request to implement a maintenance task, and/or
   acquiring the client module by interacting with a remote data source and/or a third server.

8. The method according to claim 6, wherein the method comprises a step of receiving, by the first server, data characterizing at least one right to request a particular assistance service.

* * * * *